(12) United States Patent
Taxier et al.

(10) Patent No.: US 9,704,537 B2
(45) Date of Patent: Jul. 11, 2017

(54) METHODS AND SYSTEMS FOR COORDINATING HOME AUTOMATION ACTIVITY

(71) Applicant: EchoStar Technologies, L.L.C., Englewood, CO (US)

(72) Inventors: Karen Taxier, Highlands Ranch, CO (US); Jason Walker, Aurora, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/844,862

(22) Filed: Sep. 3, 2015

(65) Prior Publication Data
US 2017/0069353 A1    Mar. 9, 2017

(51) Int. Cl.
| | | |
|---|---|---|
| *H04N 5/77* | (2006.01) |
| *G11B 27/00* | (2006.01) |
| *H04N 5/93* | (2006.01) |
| *G11B 27/34* | (2006.01) |
| *H04N 21/433* | (2011.01) |
| *H04N 21/61* | (2011.01) |
| *H04N 21/2187* | (2011.01) |
| *G08B 13/196* | (2006.01) |
| *H04N 21/4147* | (2011.01) |
| *H04N 21/436* | (2011.01) |
| *H04N 21/426* | (2011.01) |
| *H04N 21/4405* | (2011.01) |
| *G05D 23/19* | (2006.01) |

(Continued)

(52) U.S. Cl.
CPC ........... *G11B 27/34* (2013.01); *G05D 23/193* (2013.01); *G08B 13/19684* (2013.01); *H04L 12/2805* (2013.01); *H04L 12/2825* (2013.01); *H04N 21/2187* (2013.01); *H04N 21/4147* (2013.01); *H04N 21/4223* (2013.01); *H04N 21/4263* (2013.01); *H04N 21/4325* (2013.01); *H04N 21/4334* (2013.01); *H04N 21/43615* (2013.01); *H04N 21/4405* (2013.01); *H04N 21/478* (2013.01); *H04N 21/6143* (2013.01); *H04N 21/6193* (2013.01); *H04L 2012/285* (2013.01); *H04L 2012/2849* (2013.01)

(58) Field of Classification Search
CPC ... H04N 5/77; H04N 5/93; H04N 5/76; G11B 27/00
USPC .................. 386/228, 291, 278, 280
See application file for complete search history.

(56) References Cited

U.S. PATENT DOCUMENTS

| | | | | |
|---|---|---|---|---|
| 6,690,411 | B2 * | 2/2004 | Naidoo | ........... G08B 5/004 348/143 |
| 2006/0001537 | A1 * | 1/2006 | Blake | ........... G08B 13/19656 340/521 |

(Continued)

*Primary Examiner* — Daquan Zhao
(74) *Attorney, Agent, or Firm* — Kilpatrick Townsend & Stockton LLP

(57) ABSTRACT

Systems and methods of coordinating home automation activity may include accessing event data from a storage database communicatively coupled with an electronic device. Each item of event data may include a time and date at which the event data was collected. The methods may also include generating an event table identifying the number of events occurring during discrete time intervals for a date range. The event table may include a graphical depiction of the number of events that occurred for each discrete time interval. The methods may further include outputting the event table from the electronic device for display on a display device.

14 Claims, 12 Drawing Sheets

(51) Int. Cl.
*H04N 21/4223* (2011.01)
*H04N 21/478* (2011.01)
*H04N 21/432* (2011.01)
*H04L 12/28* (2006.01)
*H04N 5/76* (2006.01)

(56) References Cited

U.S. PATENT DOCUMENTS

2008/0270446 A1* 10/2008 Gossweiler ....... G06F 17/30867
2011/0010624 A1* 1/2011 Vanslette .............. G06F 3/0485
715/704
2011/0231419 A1* 9/2011 Papke ............... G06F 17/30793
707/756

* cited by examiner

METHODS AND SYSTEMS FOR COORDINATING HOME AUTOMATION ACTIVITY

CROSS-REFERENCES TO RELATED APPLICATIONS

The present application relates to application Ser. No. 14/844,939, filed on Sep. 3, 2015, and having the same title, which is herein incorporated by reference in its entirety for all purposes.

TECHNICAL FIELD

The present technology relates to systems and methods for coordinating automation activity. More specifically, the present technology relates to providing coordinated, recorded information for user access and review.

BACKGROUND

Home automation systems provide a plethora of valuable benefits. From monitoring ongoing activities to securing the home, these systems can be configured to monitor many activities. However, a variety of these abilities include recorded information during a period of time. While the availability of recorded information may aid a user in identifying events occurring throughout the period of time, the amount of data may be difficult to parse and review on a routine basis. Although a user may dedicate a portion of time to reviewing activities throughout a day, the amount of data that may have been recorded may prove too difficult to analyze on an ongoing basis.

Thus, there is a need for improved methods and systems for providing event data to a user. These and other needs are addressed by the present technology.

SUMMARY

Systems and methods of coordinating home automation activity may include accessing event data from a storage database communicatively coupled with an electronic device. Each item of event data may include a time and date at which the event data was collected. The methods may also include generating an event table identifying the number of events occurring during discrete time intervals for a date range. The event table may include a graphical depiction of the number of events that occurred for each discrete time interval. The methods may further include outputting the event table from the electronic device for display on a display device.

The methods may also include receiving an instruction selecting one or more of the discrete time intervals. In response to the instruction, the electronic device may further output for display a tabularized description of each item of event data occurring during the selected discrete time interval. In embodiments, each item of event data may also include a video recording. Additionally, in response to the instruction, the electronic device may further output for display at least an image associated with each video recording for each item of event data occurring during the selected discrete time interval. Also, in embodiments, the tabularized description for each item of event data may include at least one item selected from the group consisting of a start time for the video recording, an amount of the video recording viewed, an identification of the camera capturing the video recording, and an event type, for example.

In embodiments, the event type may include a manual recording, a motion-initiated recording, a sound-initiated recording, or a rule-initiated recording. For example, a rule-initiated recording may be triggered by an alarm, or a connected device. The storage database utilized may include at least one of a local database, or a network-accessible storage database. Also, the graphical depiction may include a bar chart having a bar for each discrete time interval, and the bar height and/or color may be commensurate with the number of items of event data occurring for each discrete time interval. In embodiments, the event table may further include selectable filters, and the methods may also include receiving an instruction to apply a filter to the event table. The selectable filters may include at least one option to filter by discrete time interval, camera, or trigger, for example. In utilizing the filters, the methods may also include applying at least one filter to the event table, and the application of the filter may adjust the bar chart bar height to include only the items of event data included by the at least one filter. Also, in embodiments, the electronic device may be or include a television receiver.

The present technology additionally includes a home automation system hub that may include a first input component configured to receive multimedia data, a second input component configured to receive user input, and at least one output component communicatively coupled with at least one display device. The hub may include one or more processors, and may also include memory communicatively coupled with and readable by the one or more processors and having stored therein processor-readable instructions, which when executed by the one or more processors cause the one or more processors to access event data from a storage database communicatively coupled with an electronic device. In embodiments, each item of event data may include a time and date at which the event data was collected. The processors may be further caused to generate an event table identifying the number of events occurring during discrete time intervals for a date range. In embodiments, the event table may include a graphical depiction of the number of events that occurred for each discrete time interval. The methods may further include outputting the event table from the electronic device for display on a display device. Additionally, the multimedia data may include satellite broadcast television, and the home automation system hub may also include a network input component configured to receive video data from communicatively coupled cameras. Also, in embodiments, the graphical depiction may include a bar chart having a bar for each discrete time interval, and the bar height and/or color may be commensurate with the number of items of event data occurring for each discrete time interval.

The present technology also includes methods of coordinating home automation activity. The methods may include accessing event data from a storage database communicatively coupled with an electronic device, and each item of event data may include a time and date at which the event data was collected. The methods may also include monitoring the event data to determine that the number of items of event data for a discrete time interval surpasses a pre-defined threshold. The methods may further include transmitting an alert to a mobile device that the pre-defined threshold has been surpassed. In embodiments, the alert may include a link to a camera associated with at least one of the items of event data. The methods may further include generating an event table identifying the number of events occurring during discrete time intervals for a date range, and the event table may include a graphical depiction of the number of events that occurred for each discrete time interval. Additionally, the alert may further include a link to access the event table. In embodiments, the graphical depiction may include a bar chart having a bar for each discrete time interval, and the bar height and/or color may be commensurate with the number of items of event data occurring for each discrete time interval. Additionally, the event table may include selectable links to live-stream a camera.

Such technology may provide numerous benefits over conventional techniques. For example, the technology may allow a user to quickly identify a time of day during which a crisis may have occurred. Additionally, the technology may allow a user to quickly identify events worth review on a daily or other time basis. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

A television receiver may serve as a host for a home automation system. By using a television receiver to host a home automation system, various advantages may be realized. For instance, the home automation system may be able to conveniently present home automation information to a user via a connected display device, such as a television or other connected devices, such as a tablet computer, mobile phone, monitor, or laptop computer. However, the amount of home automation activity recorded throughout a discrete time interval such as a day may include an amount of data a user cannot readily review in a reasonable amount of time. As will be explained below, the present technology allows a user to quickly identify time intervals of increased activity for review and consideration. After describing media service systems and electronic devices in FIGS. 1 and 2 that may be utilized in the present technology, methods and systems will be explained with the remaining figures.

Figure 1:
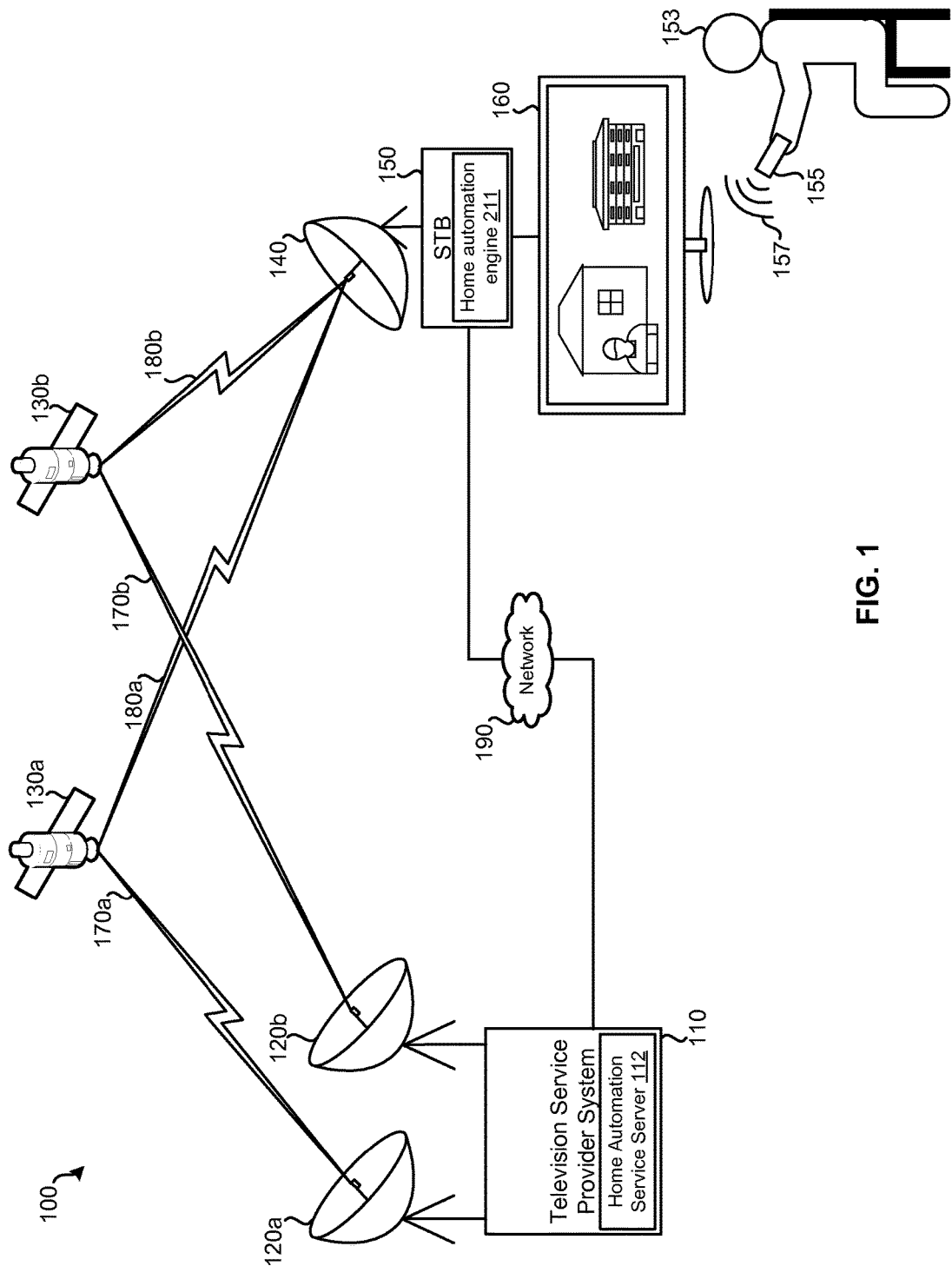
FIG. 1 shows a simplified media service system that may be used in accordance with embodiments of the present technology.

FIG. 1 illustrates an embodiment of a satellite television distribution system 100. While a home automation system may be incorporated with various types of television receivers, various embodiments may be part of a satellite-based television distribution system. Cable, IP-based, wireless, and broadcast focused systems are also possible. Satellite television distribution system 100 may include: television service provider system 110, satellite transmitter equipment 120, satellites 130, satellite dish 140, television receiver 150, home automation service server 112, and display device 160. The display device 160 can be controlled by a user 153 using a remote control device 155 that can send wired or wireless signals 157 to communicate with the STB 150 and/or display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to a television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
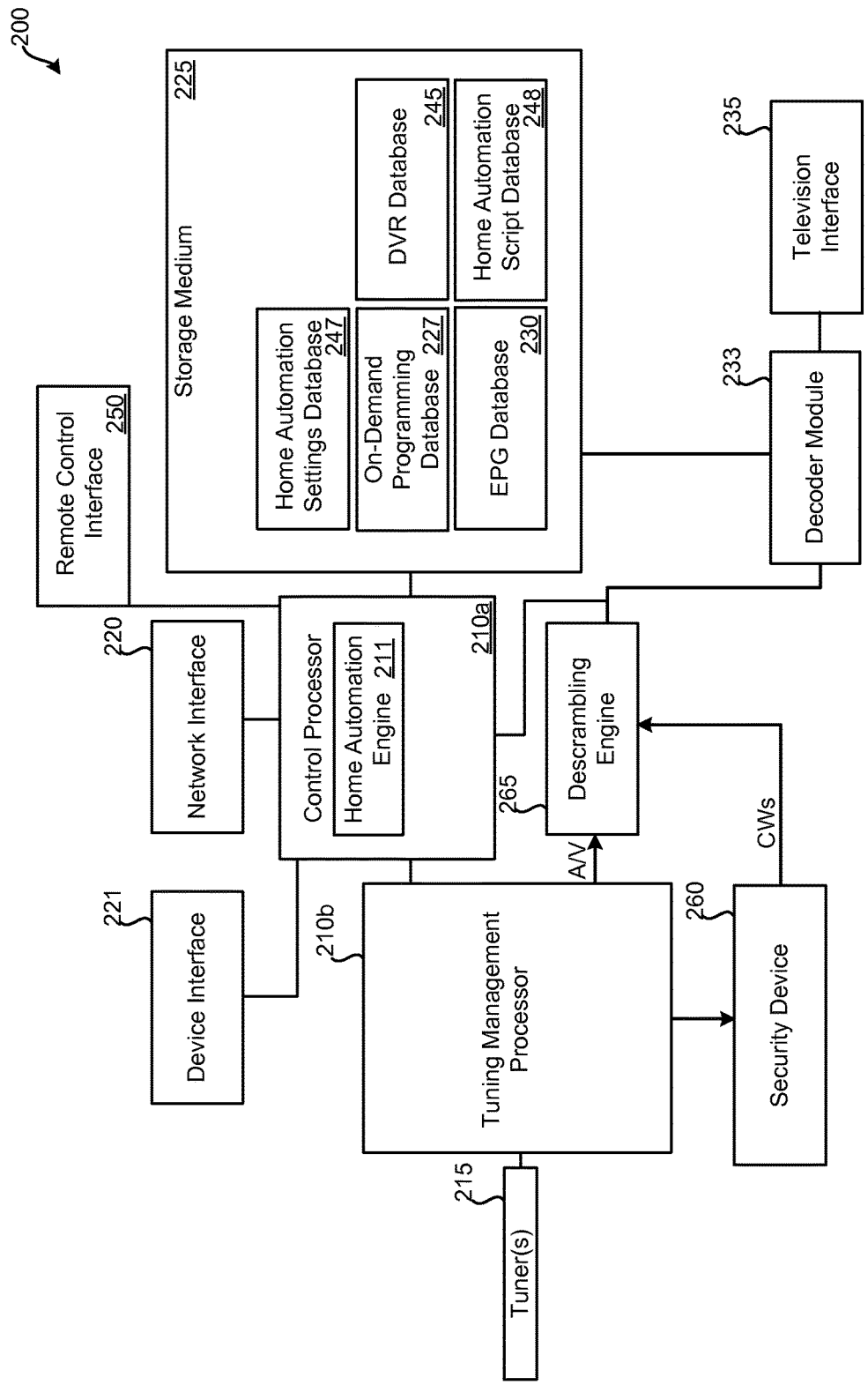
FIG. 2 illustrates an exemplary electronic device that may be used in accordance with embodiments of the present technology.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 provides additional detail of various embodiments of a television receiver. A television receiver is defined to include set-top boxes (STBs), and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 211, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170a represents a signal between satellite transmitter equipment 120 and satellite 130a. Uplink signal 170b represents a signal between satellite transmitter equipment 120 and satellite 130b. Each of uplink signals 170 may contain streams of one or more different television channels. For example, uplink signal 170a may contain a first group of television channels, while uplink signal 170b contains a second group of television channels. Each of these television channels may be scrambled such that unauthorized persons are prevented from accessing the television channels.

Downlink signal 180a represents a signal between satellite 130a and satellite dish 140. Downlink signal 180b represents a signal between satellite 130b and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180a may be a first transponder stream containing a first group of television channels, while downlink signal 180b may be a second transponder stream containing a different group of television channels. In addition to or instead of containing television channels, a transponder stream can be used to transmit on-demand content to television receivers, including PPV content, which may be stored locally by the television receiver until output for presentation.

FIG. 1 illustrates downlink signal 180a and downlink signal 180b, being received by satellite dish 140 and distributed to television receiver 150. For a first group of television channels, satellite dish 140 may receive downlink signal 180a and for a second group of channels, downlink signal 180b may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112. Although illustrated as part of the television service provider system, the home automation service server 112 may be provided by a third party in embodiments. In addition or in alternate to network 190, a telephone, e.g., landline, or cellular connection may be used to enable communication between television receiver 150 and television service provider system 110.

FIG. 2 illustrates an embodiment of a television receiver 200, which may represent television receiver 150 of FIG. 1. Television receiver 200 may be configured to function as a host for a home automation system either alone or in conjunction with a communication device. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television.

Television receiver 200 may be incorporated as part of a television, such as display device 160 of FIG. 1. Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 227, home automation settings database 247, home automation script database 248, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210a may also communicate with network interface 220 and remote control interface 250. Control processor 210a may handle incoming data from network interface 220 and remote control interface 250. Additionally, control processor 210a may be configured to output data via network interface 220.

Control processor 210a may include home automation engine 211. Home automation engine 211 may permit television receiver and control processor 210a to provide home automation functionality. Home automation engine 211 may have a JSON (JavaScript Object Notation) command interpreter or some other form of command interpreter that is configured to communicate with wireless devices via network interface 220 and a message server, possibly via a message server client. Such a command interpreter of home automation engine 211 may also communicate via a local area network with devices without using the Internet. Home automation engine 211 may contain multiple controllers specific to different protocols; for instance, a ZigBee® controller, a Z-Wave® controller, and/or an IP camera controller, wireless LAN, 802.11, may be present. Home automation engine 211 may contain a media server configured to serve streaming audio and/or video to remote devices on a local area network or the Internet. Television receiver may be able to serve such devices with recorded content, live content, and/or content recorded using one or more home automation devices, such as cameras.

Tuners 215 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 215 may be capable of receiving and processing a single transponder stream from a satellite transponder or from a cable network at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to which frequencies are to be tuned.

Network interface 220 may be used to communicate via an alternate communication channel with a television service provider, if such communication channel is available. A communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used. Network interface 220 may permit wireless communication with one or more types of networks, including using home automation network protocols and wireless network protocols. Also, wired networks may be connected to and communicated with via network interface 220. Device interface 221 may represent a USB port or some other form of communication port that permits communication with a communication device as will be explained further below.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, home automation settings database 247, and/or home automation script database 248. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

Home automation settings database 247 may allow configuration settings of home automation devices and user preferences to be stored. Home automation settings database 247 may store data related to various devices that have been set up to communicate with television receiver 200. For instance, home automation settings database 247 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Home automation settings database 247 may store information that allows for the configuration and control of individual home automation devices which may operate using Z-wave and Zigbee-specific protocols. To do so, home automation engine 211 may create a proxy for each device that allows for settings for the device to be passed through a UI, e.g, presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device. For example, a piece of exercise equipment that is enabled to interface with the home automation engine 211, such as via device interface 221, may be configured at the electronic device 211 in addition to on the piece of exercise equipment itself. Additionally, a mobile device or application residing on a mobile device and utilized with exercise equipment may be configured in such a fashion as well for displaying received fitness information on a coupled display device.

Home automation script database 248 may store scripts that detail how home automation devices are to function based on various events occurring. For instance, if stored content starts being played back by television receiver 200, lights in the vicinity of display device 160 may be dimmed and shades may be lowered by communicatively coupled and controlled shade controller. As another example, when a user shuts programming off late in the evening, there may be an assumption the user is going to bed. Therefore, the user may configure television receiver 200 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, home automation script database 248 may allow for various music profiles to be implemented. For instance, based on home automation settings within a structure, appropriate music may be played. For instance, when a piece of exercise equipment is connected or is used, energizing music may be played. Conversely, based on the music being played, settings of home automation devices may be determined. If television programming, such as a movie, is output for playback by television receiver 150, a particular home automation script may be used to adjust home automation settings, e.g., lower lights, raise temperature, and lock doors.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 230 and/or information from EPG database 230, to a television for presentation. Television interface 235 may also serve to output a CVM.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

On-demand programming database 227 may store additional television programming. On-demand programming database 227 may include television programming that was not recorded to storage medium 225 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet.

Referring back to tuners 215, television channels received via satellite or cable may contain at least some scrambled data. Packets of audio and video may be scrambled to prevent unauthorized users, e.g., nonsubscribers, from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card, or the like.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage, in DVR database 245, and/or to decoder module 233 for output to a television or other presentation equipment via television interface 235.

In some embodiments, the television receiver 200 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 200 may be configured to reboot at random times during the night in order to allow for installation of updates. Thus, an intruder is less likely to guess the time when the system is rebooting. In some embodiments, the television receiver 200 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 1100 of FIG. 11.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 200 may be performed by an overlay device. If such an overlay device is used, television programming functions may still be provided by a television receiver that is not used to provide home automation functions.

Figure 3:
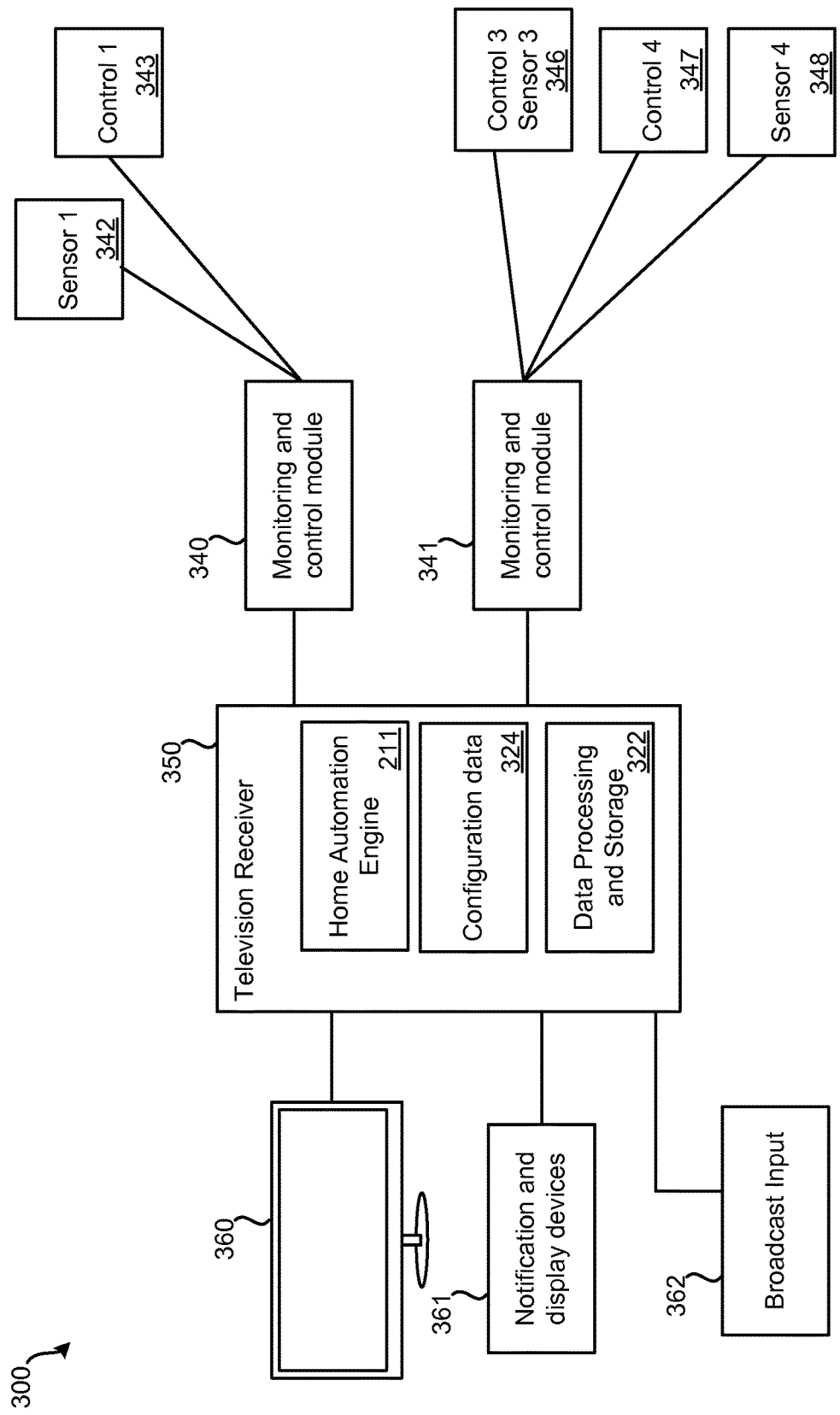
FIG. 3 illustrates an exemplary home automation system setup in accordance with embodiments of the present technology.

FIG. 3 shows an embodiment of a system for home monitoring and control that includes a television receiver 350. The system 300 may include a television receiver that is directly or indirectly coupled to one or more display devices 360 such as a television or a monitor. The television receiver may be communicatively coupled to other display and notification devices 361 such as stereo systems, speakers, lights, mobile phones, tablets, and the like. The television receiver may be configured to receive readings from one or more sensors 342, 348, or sensor systems 346 and may be configured to provide signals for controlling one or more control units 343, 347 or control systems 346.

In embodiments the television receiver may include a monitoring and control module 340, 341 and may be directly or indirectly connected or coupled to one or more sensors and/or control units. Sensors and control units may be wired or wirelessly coupled with the television receiver. The sensors and control units may be coupled and connected in a serial, parallel, star, hierarchical, and/or the like topologies and may communicate to the television receiver via one or more serial, bus, or wireless protocols and technologies which may include, for example, WiFi, CAN bus, Bluetooth, I2C bus, ZigBee, Z-Wave and/or the like.

The system may include one or more monitoring and control modules 340, 341 that are external to the television receiver 350. The television receiver may interface to sensors and control units via one or more of the monitoring and control modules. The external monitoring and control modules 340, 341 may be wired or wirelessly coupled with the television receiver. In some embodiments, the monitoring and control modules may connect to the television receiver via a communication port such as a USB port, serial port, and/or the like, or may connect to the television receiver via a wireless communication protocol such as Wi-Fi, Bluetooth, Z-Wave, ZigBee, and the like. The external monitoring and control modules may be a separate device that may be positioned near the television receiver or may be in a different location, remote from the television receiver.

In embodiments, the monitoring and control modules 340, 341 may provide protocol, communication, and interface support for each sensor and/or control unit of the system. The monitoring and control module may receive and transmit readings and provide a low level interface for controlling and/or monitoring the sensors and/or control units. The readings processed by the monitoring and control modules 340, 341 may be used by the other elements of the television receiver. For example, in some embodiments the readings from the monitoring and control modules may be logged and analyzed by the data processing and storage 322 module. The data processing and storage 322 module may analyze the received data and generate control signals, schedules, and/or sequences for controlling the control units. Additionally, the data processing and storage module 322 may utilize input data to generate additional outputs. For example, the module 322 may receive from a sensor 342 information from a communicatively coupled piece of equipment. The sensor may be a part of or attached to the equipment in various embodiments. The equipment may provide information regarding movements, alarms, or notifications associated with the home, and the data processing module 322 may use this data to generate relative distance information to be output to and displayed by display device 360. In some embodiments, the monitoring and control modules 340, 341 may be configured to receive and/or send digital signals and commands to the sensors and control units. The monitoring and control modules may be configured to receive and/or send analog signals and commands to the sensors and control units.

Sensors and control units may be wired or wirelessly coupled to the monitoring and control modules 340, 341 or directly or indirectly coupled with the receiver 350 itself. The sensors and control units may be coupled and connected in a serial, parallel, star, hierarchical, and/or the like topologies and may communicate to the monitoring and control modules via one or more serial, bus, or wireless protocols and technologies. The sensors may include any number of temperature, humidity, sound, proximity, field, electromagnetic, magnetic sensors, cameras, infrared detectors, motion sensors, pressure sensors, smoke sensors, fire sensors, water sensors, and/or the like. The sensors may also be part of or attached to other pieces of equipment, such as exercise equipment, doors or windows, or home appliances, or may be applications or other sensors as part of mobile devices.

The monitoring and control modules 340, 341 may be coupled with one or more control units. The control units may include any number of switches, solenoids, solid state devices and/or the like for making noise, turning on/off electronics, heating and cooling elements, controlling appliances, HVAC systems, lights, and/or the like. For example, a control unit may be a device that plugs into an electrical outlet of a home. Other devices, such as an appliance, may be plugged into the device. The device may be controlled remotely to enable or disable electricity to flow to the appliance. A control unit may also be part of an appliance, heating or cooling system, and/or other electric or electronic devices. In embodiments the control units of other system may be controlled via a communication or control interface of the system. For example, the water heater temperature setting may be configurable and/or controlled via a communication interface of the water heater or home furnace. Additionally, received telephone calls may be answered or pushed to voicemail in embodiments.

The controllers, e.g., controller 343, may include a remote control designed for association with the television receiver. For example, the receiver remote control device may be communicatively coupled with the television receiver, such as through interface 250, or one or more of the monitoring and control modules for providing control or instruction for operation of the various devices of the system. The control may be utilized to provide instructions to the receiver for providing various functions with the automation system including suspending alert notifications during an event. For example, a user may determine prior to or during an event that he wishes to suspend one or more types of notifications until the event has ended, and may so instruct the system with the controller.

Sensors may be part of other devices and/or systems. For example, sensors may be part of a mobile device such as a phone. The telemetry readings of the sensors may be accessed through a wireless communication interface such as a Bluetooth connection from the phone. As another example, temperature sensors may be part of a heating and ventilation system of a home. The readings of the sensors may be accessed via a communication interface of the heating and ventilation system. Sensors and/or control units may be combined into assemblies or units with multiple sensing capabilities and/or control capabilities. A single module may include, for example a temperature sensor and humidity sensor. Another module may include a light sensor and power or control unit and so on.

In embodiments, the sensors and control units may be configurable or adjustable. In some cases the sensors and control units may be configurable or adjustable for specific applications. The sensors and control units may be adjustable by mechanical or manual means. In some cases the sensors and control units may be electronically adjustable from commands or instructions sent to the sensors or control units. For example, the focal length of a camera may be configurable in some embodiments. The focal length of a camera may be dependent on the application of the camera. In some embodiments the focal length may be manually set or adjusted by moving or rotating a lens. In some embodiments the focal length may be adjusted via commands that cause an actuator to move one or more lenses to change the focal length. In other embodiments, the sensitivity, response, position, spectrum and/or like of the sensors may be adjustable.

During operation of the system 300, readings from the sensors may be collected, stored, and/or analyzed in the television receiver 350. In embodiments, analysis of the sensors and control of the control units may be determined by configuration data 324 stored in the television receiver 350. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time based analysis to determine trends, such as temperature fluctuations in a typical day or energy usage. Such trending information may be developed by the receiver into charts or graphs for display to the user. For other applications, sensor analysis may include monitoring sensor readings to determine if a threshold value of one or more sensors has been reached.

The function of the system may be determined by loading and/or identifying configuration data for an application. In embodiments, the system 300 may be configured for more than one monitoring or control operation by selecting or loading the appropriate configuration data. In some embodiments the same sensors and/or control units may be used for multiple applications depending on the configuration data used to process and analyze sensor readings and/or activate the control units. Multiple monitoring and/or control applications may be active simultaneously or in a time multiplexed manner using the same or similar set of sensors and/or control units.

For example, the system 300 may be configured for both exercise monitoring and temperature monitoring applications using the same set of sensors. In embodiments, both monitoring applications may be active simultaneously or in a time multiplexed manner depending on which configuration data is loaded. In both monitoring applications the same sensors, such as proximity sensors, or cameras may be used. Using the same sensors, the system may be configured for space temperature monitoring. For temperature monitoring, the system may only monitor a specific subset of the sensors for activity. For temperature monitoring, sensor activity may not need to be saved or recorded. The sensor readings may be monitored for specific thresholds which may indicate a threshold temperature for adjusting the space temperature. In this example, the two different monitoring examples may be selected based on the active configuration data. When one configuration data is active, data from the sensors may be saved and analyzed. When the second configuration data is active, the system may monitor sensor readings for specific thresholds. Of course, multiple or alternative sensors may be used as well.

In embodiments the results, status, analysis, and configuration data details for each application may be communicated to a user. In embodiments auditory, visual, and tactile communication methods may be used. In some cases a display device such as a television may be used for display and audio purposes. The display device may show information related to the monitoring and control application. Statistics, status, configuration data, and other elements may be shown. Users may also save particular configuration data for devices, such as notification suspensions while the user is using the coupled display. A user may log in or be recognized by the system upon activation and the system may make adjustments based on predetermined or recorded configuration data. For example, a user may have instructed that when he is recognized by the system, either automatically or with provided login information, a notification suspension profile personal to the user be enacted. That profile may include that the user would like to continue to receive alarms, such as smoke, fire, or hazard alarms, but that received telephone call information is suspended. The user may access the profile and select to begin, the user may be recognized by the system, or a combination such as being recognized by the system such that the television operations are performed or are input by a remote control, while the user himself selects a particular activity to perform with the system.

Any number of additional adjustments or operations may be performed as well, as would be understood as encompassed by the present technology. For example, the space temperature may be monitored or adjusted as well. In one situation, after the user has been exercising for a period of time, generated heat may raise the space temperature above a threshold such that the home automation engine 211 additionally begins operation or adjustment of the HVAC system to cool the space. Additionally, configuration data for the user may include reducing the space temperature to a particular degree based on a preference of the user. Thus, when the user loads a profile or begins exercising, the home automation system may automatically begin adjusting the space temperature as well in anticipation of heat generation or user preferences.

In embodiments the system may include additional notification and display devices 361 capable of notifying the user, showing the status, configuration data, and/or the like. The additional notification and display devices may be devices that are directly or indirectly connected with the television receiver. In some embodiments computers, mobile devices, phones, tablets, and the like may receive information, notifications, control signals, etc., from the television receiver. Data related to the monitoring and control applications and activity may be transmitted to remote devices and displayed to a user. Such display devices may be used for presenting to the user interfaces that may be used to further configure or change configuration data for each application. An interface may include one or more options, selection tools, navigation tools for modifying the configuration data which in turn may change monitoring and/or control activity of an application. Modification to a configuration may be used to adjust general parameters of a monitoring application to specific constraints or characteristics of a home, user's schedule, control units, and/or the like.

Display interfaces may be used to select and/or download new configurations for monitoring and/or control applications. A catalog of pre-defined configuration data definitions for monitoring and control applications may be available to a user. A user may select, load, and/or install the applications on the television receiver by making a selection using in part the display device. For example, a user may load a profile based on notification suspension preferences as discussed above. In embodiments, configuration data may be a separate executable application, code, package, and/or the like. In some cases, the configuration data may be a set of parameters that define computations, schedules, or options for other processor executable code or instructions. Configuration data may be a meta data, text data, binary file, and/or the like.

In embodiments notification and display devices may be configured to receive periodic, scheduled, or continuous updates for one or more monitoring and control applications. The notifications may be configured to generate pop-up screens, notification banners, sounds, and/or other visual, auditory, and/or tactile alerts. In the case where the display device is a television, some notifications may be configured to cause a pop-up or banner to appear over the programming or content being displayed, such as when a proximity monitor has been triggered in the home. Such an alert may be presented in a centrally located box or in a position different from the fitness information to make it more recognizable. Additionally the program being watched can be paused automatically while such an alert is being presented, and may not be resumed unless receiving an input or acceptance from the user. Some notifications may be configured to cause the television to turn on if it is powered off or in stand-by mode and display relevant information for a user. In this way, users can be warned of activity occurring elsewhere in the system.

The television receiver may also be configured to receive broadcast or other input 362. Such input may include television channels or other information previously described that is used in conjunction with the monitoring system to produce customizable outputs. For example, a user may wish to watch a particular television channel while also receiving video information of activities occurring on the property. The television receiver may receive both the exterior camera information and television channel information to develop a modified output for display. The display may include a split screen in some way, a banner, an overlay, etc.

Figure 4:
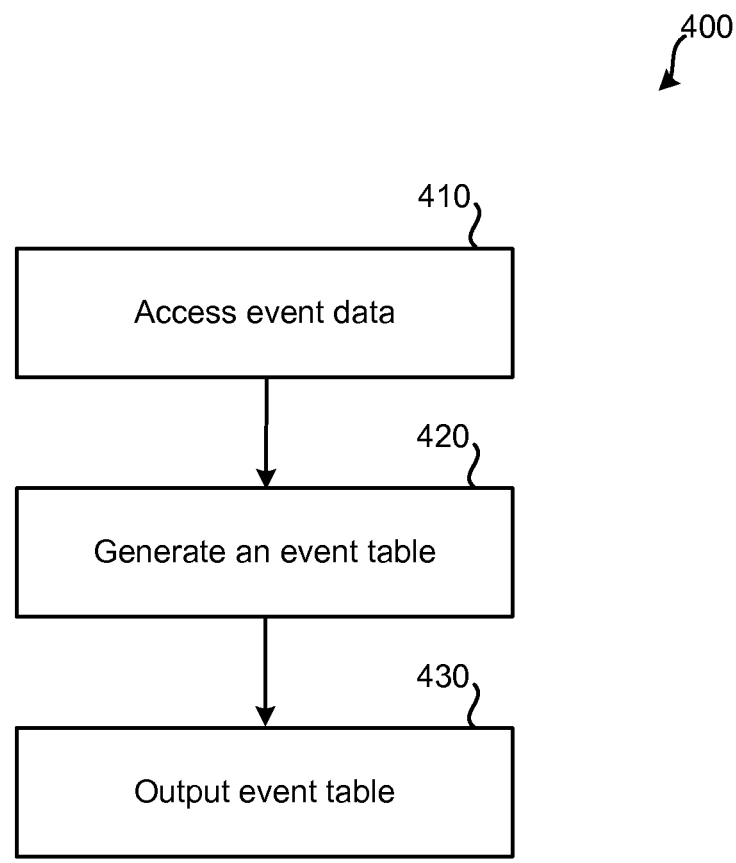
FIG. 4 shows a simplified flow diagram of a method of coordinating home automation activity according to embodiments of the present technology.

The systems and devices previously described may be used in performing various methods. The methods may also be represented by programming stored in memory of a computing device. FIG. 4 illustrates an embodiment of a method 400 for coordinating home automation activity. Method 400 may be performed using any of the systems or components previously described. Method 400 may allow for an electronic device to receive and present event information over discrete time intervals for user review and consideration. Each step of method 400 may be performed at or by a single electronic device, such as an STB, television receiver, computer, or mobile device, for example, or by multiple devices communicating with one another. For example, such electronic device or devices may be a hub for the home automation system in embodiments of the present technology. Means for performing each step of method 400 include an electronic device and/or the various components of an electronic device or distribution system, such as those detailed in relation to FIGS. 1 and 2. Method 400 may be performed using a computerized device, such as a device incorporating some or all of the components of computer system 1100 of FIG. 11.

The method may include accessing event data at operation 410. The event data may be accessed from a storage database communicatively coupled with an electronic device that accesses the event data. The event data may include a host of information that in embodiments may include a time and date at which the event data was collected. The methods may also include generating an event table identifying the number of events occurring during discrete time intervals for a date range or period of time at operation 420. The event table may provide a graphical depiction of the number of events that occurred for each discrete time interval in embodiments. The methods may also include outputting the event table from the electronic device for display on a display device at operation 430.

The present methods may allow a user to review an overview of events that have been recorded or generated throughout time intervals of minutes, hours, days, months, years, etc. Such methods may be utilized with a home automation system for reviewing security and event information, for example. In embodiments, any one or more of a plurality of connected devices as previously described may record or output information or data throughout a day. Sensors may provide information that a temperature has passed a set point, which may cause a cooling system to be engaged for cooling the space. If a smoke detector recognizes smoke within a space, it may enable an alarm or other sprinkler system for reacting to a potential fire. Many other examples available with a home automation system will be readily understood to be encompassed by the present technology. In embodiments, each time an event occurs related to the home automation system, the data associated with the event may be collected and stored in the storage database. In embodiments, the data may include some or all information or data related to the event.

In one embodiment, a security system may be a part of the home automation system, and may include cameras and other sensors and devices related to home security. The cameras may include motion detectors, sound detectors, thermal detectors, etc., that may be coupled with the one or more cameras to instruct them when to record. A camera may be configured to record constantly, at particular times based on pre-set instructions, or when a sensor has been tripped or triggered. Any one of these scenarios may be considered an event in relation to the present technology. For example, a camera may be coupled with a motion sensor, which when triggered causes the camera to begin recording. The camera may continue recording until the sensor ceases to note motion, or for a pre-determined amount of time, which can be for a few seconds or more, about 30 seconds or more, about 1 minute or more, about 5 minutes or more, about 10 minutes or more, or for any period of time for which the camera may be set to record. A similar scenario can be triggered by a sound detector, for example. In still other embodiments, a manual recording may be initiated at any time by a user of the system, which may record for any period of time the user wishes, or for pre-set periods of time as instructed by a user during system setup, for example.

When a camera begins recording, the video recording may be included with the collected event data for the event, and may be stored in the storage database. The event data for a particular event may then include a time, date, video recording, triggering event explanation, sensor or camera identification, event duration, and any other information related to the event that occurs. Such information may be stored for every event that occurs during a day, or may be set by a user to include only particular types of data for particular events. For example, security events such as motion-activated camera activity may include all relevant data for the event, while the engagement of an HVAC system may include only the time at which the system was started and stopped in embodiments.

While a user is away, such as at work, running errands, or on vacation, this event data may be collected for every event which may occur during the day or time period. Over the course or a workday or time period, these events may increase to a point of reaching or exceeding an amount of storage space in the storage database allocated for such activity. The storage database may include a local storage database on the electronic device in embodiments, and may also include a cloud-based storage or network-accessible storage external to the electronic device. For example, the service provider of the system may include an amount of external storage for use by individual users, that may include a subscription-based amount of storage, video quality, period for individual event storage, etc. Based on the subscription or amount of storage generally available to an individual user, event data, which may include video recordings, may fully utilize the available storage on a regular basis. As the storage space fills, it may be re-used in any number of ways including discarding the oldest events to provide space for newer events, for example. Accordingly, a user may wish to review event data on a regular basis in order to ensure security or other events have been recognized by the user. Regardless of storage requirements, a user may also simply wish to review the events during a period of time he or she was away from the home, business, or space at which the system is set.

As stated, based on the number of events that occur during a day or time period, the amount of review for a user may be quite large. The present technology may allow the user to be presented with an overview of all events that have occurred during the time period, and present it to the user in a useful way. For example, after a user has returned from work at the end of the day, he may access the electronic device to review event data. In an embodiment, the electronic device includes a television receiver, and may be a set-top box including a satellite or cable box. A user may be watching television, for example, and may wish to alternatively or simultaneously review event data for the day.

As explained with regard to an embodiment in which the electronic device or hub includes a television receiver, such as for example with a set-top box, a user may provide an instruction to the electronic device to present events for review. The electronic device may access the storage database to retrieve all event data for a time period, which may default to the past 24 hours, or current day, or previous day, for example, and may be set to retrieve any amount of data or for any particular time period. The electronic device may retrieve the data from a storage database that may include local storage and remote storage, such as cloud storage, for example. In embodiments, certain information may be stored locally including event details, while other data, such as video recordings, may be stored externally, such as in cloud storage. Additionally, the event details may be stored both locally and in cloud storage for use in multiple ways.

Once retrieved, the electronic device may analyze the data or parse the data for presentation. For example, the device may develop or generate an event table that includes information for each item of event data over the time period, or the item of event data itself. For example, the table may include the actual time and date information for each event, and may include a video recording associated with the event, or may include one or more selectable links to the video recording. The table may further parse and organize the data into discrete time intervals across the period of time, such as in hour or some number of minute increments, for example. The electronic device may then utilize this parsed information to produce a graphical depiction of each item of the event data across the discrete time intervals. An exemplary graphical depiction according to embodiments of the methods is illustrated in FIG. 5.

Figure 5A:
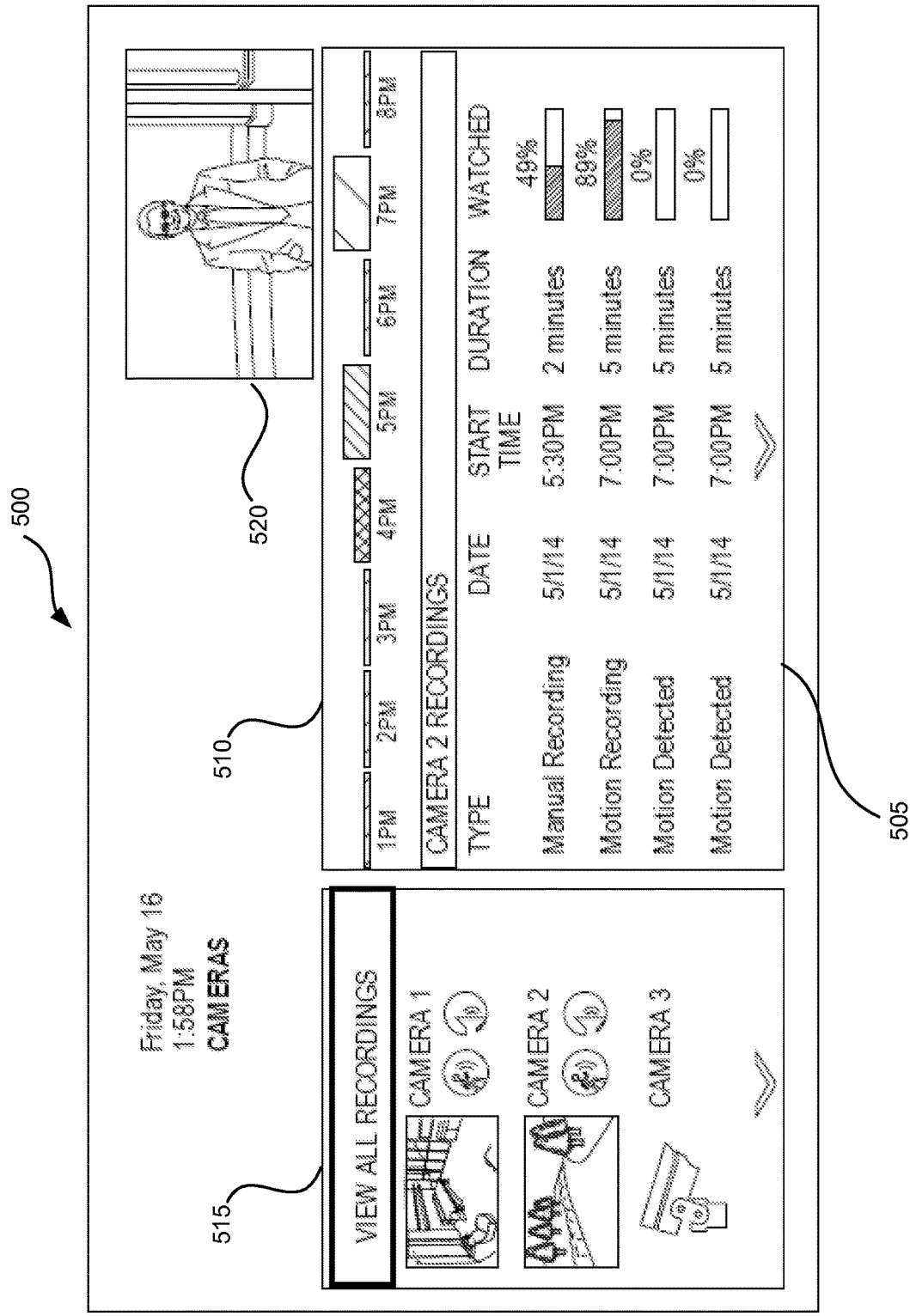
FIG. 5A illustrates an exemplary overlay of an event table identifying events occurring during discrete time intervals according to embodiments of the present technology.

FIG. 5A shows an exemplary overlay 500 of event data for a home automation system according to the present technology. Overlay 500 may include a number of elements, including an event table 505 including a graphical depiction 510 of event data. Event table 505 may include some or all of the event data occurring during the period of time. For example, the table may include all alarms, video recordings, and system notifications that have occurred throughout the day. The event table may organize the events based on any number of event particulars including the type of event, the sensor or home automation feature receiving the event, the start and/or end time of the event, the date, the duration of the event, as well as aspects of the event related to the event data available. For example, for video recordings, the event table may also include information regarding whether the recording has been viewed, or an amount of how much of the recording has been viewed. The event type may include whether the event is a particular sensor event, or for a home automation feature such as a security camera, whether the event is a manual recording, a timer-based recording, a motion-initiated, a sound-initiated recording, or a rule-initiated recording. A rule-initiated recording may be a recording triggered by an alarm or a connected device, for example. In an embodiment, a user may have a camera set up to record an entryway (in the home or outside) when the doorbell is activated, or if a smoke alarm somewhere in the house initiates, a camera for that zone may begin recording. Any number of rules may be initiated for these or other home features and are understood to be encompassed by the present technology.

Presented within or with the event table may be a graphical depiction 510 of the number of events that occurred for each discrete time interval of the period of time. For example, if the time period displayed is a particular day, the discrete time intervals may include a series of hours throughout the day. The series may include every hour of the day, or may include a subset of hours in the day such as only those hours during which an event took place, or only those hours for which the user is not home and has selected for review. As illustrated in the Figure, in an embodiment the graphical depiction may be or include a bar chart having a bar for each discrete time interval. In embodiments, the bar height and/or color may be used to indicate the number of items of event data occurring for each discrete time interval. For example, as the number of events during a discrete time interval increases, the bar height may increase commensurately.

Additionally, preset colors may be utilized to indicate the severity in the number of events during a time interval to provide a user with a visual cue to review the particular time interval for any major events. For example, as the number of events during a discrete time interval increases, the color of the corresponding bar may change. In an embodiment, one or no events during a discrete time interval may have a bar color that is a more neutral color, such as blue or green for example. For more events, such as 2 or 3, for example, the bar color for that time interval may change to yellow. As the event number increases to 4 or 5, the bar color for that time interval may change to orange, and as the number increases over 5 the bar color may change to red. It is to be understood that the numbers listed are only examples, and that the actual colors used may be set based on an average number of events that occur in an individual situation, or any number preference of a user. For example, in a home in which there are many people constantly coming and going, the user may set up the system colors to be double, triple, or more of the listed numbers for each color, or any other number of the user's choosing. Similarly, any particular color combination may be used or chosen by a user of the system.

Figure 5B:
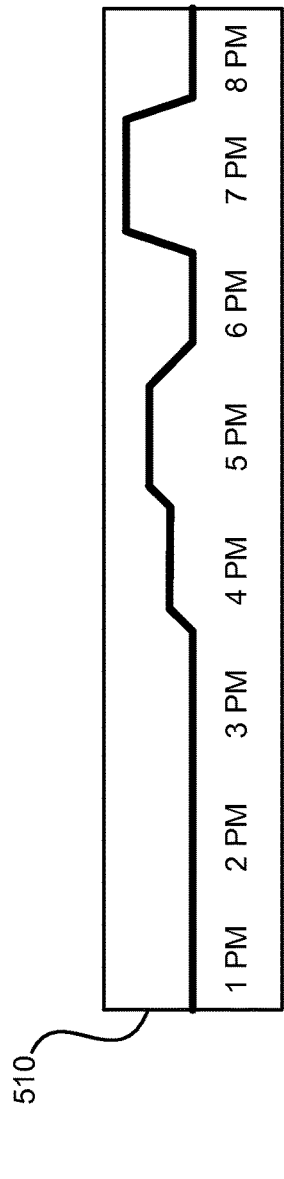
FIG. 5B illustrates an exemplary event table identifying events occurring during discrete time intervals according to embodiments of the present technology.

Graphical depiction 510 may take a variety of forms in embodiments that may be used in alternative arrangements or in combined forms. As illustrated in FIG. 5B, the graphical depiction 510 may take the form of a line graph indicating the number of events occurring during discrete time intervals. As would be understood, the line graph may also be combined with the previously described bar chart in embodiments. The line itself may take any number of forms such as an angular view as illustrated in the figure, as well as a curved view having rounded corners, as well as any other line that may convey the number of events that occur during a specific time interval.

Figure 5C:
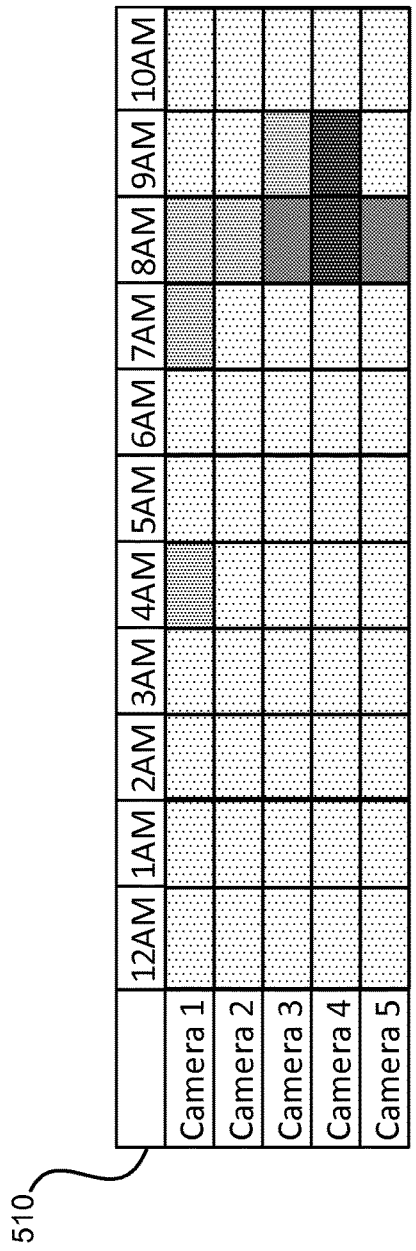
FIG. 5C illustrates an exemplary event table identifying events occurring during discrete time intervals according to embodiments of the present technology.

In another embodiment as illustrated in FIG. 5C, the graphical depiction 510 may take the form of a chart or spreadsheet indicating the number of events occurring during discrete time intervals. As illustrated, such a format may allow additional information to be displayed including the discrete cameras, for example, as well as any other sensors or zones that may be identified for a space. Within the chart the events may be differentiated in any number of ways including by shading within a specific color scheme as well as with alternate colors based on the number of events. For example, the same or a relatively similar scheme may be used as identified above for colors including yellow, orange, red, etc., to identify time intervals during which events occur. In another example shading may be utilized with one or more colors to indicate the number of events. As illustrated, for example, based on the darker shading at 8 AM and 9 AM, a user may identify that multiple events were detected by Camera 4 during those times. Any other presentation schemes or variations on the provided examples as would be understood to identify the number of events occurring during discrete time intervals are similarly encompassed by the present technology, and may be utilized alone or in combination in order to present the information of most use to a user of the technology.

In embodiments, a user may scroll to an individual bar of the bar chart and access the number of events for that time interval. For example, the event table may list all video recordings and/or events for a day, and then as a user scrolls over individual bars, the event table may adjust to show only the events of that time interval. Thus, in the corresponding methods, the methods may also include receiving an instruction selecting one or more of the discrete time intervals. The user may provide those instructions with a remote device or mobile device, which can include a remote associated with the electronic device, such as a television or set-top box remote, for example. The methods may also include having the electronic device, in response to the instruction, further output for display a tabularized description of each item of event data occurring during the selected discrete time interval. The tabularized description may be shown in the event table location, and include any of the data previously described.

In embodiments the user may also scroll down or over individual events within the event table, and select particular events for viewing, such as viewing additional particulars of the event or watching associated video. For example, for a sensor based event, by selecting the event in the event table, the user may learn the particulars of the event not already listed, such as a temperature relating to a temperature sensor based event. For events including a video recording, scrolling over the event may provide an image or screen shot from the camera in a viewing window 515. Again, the corresponding methods may include receiving an instruction to select one of the time intervals, which may include an actual selection, such as clicking on an interval or bar, or a scrolling operation over a listing. In response to the instruction, the electronic device may output for display at least an image associated with each video recording for each item of event data occurring during the selected discrete time interval. Additionally, for a user scrolling over individual events within the event table listings, the electronic device may automatically output for display at least an image associated with the video recording, or may automatically begin streaming or playing the event in the viewing window.

The viewing window, the event table, or an additional window for display within the overlay may provide selectable filters allowing a user to filter event data. The filters may include filters for particular discrete time intervals, filters for particular sensors, cameras, or household devices, cameras for particular triggers such as motion-initiated events, etc. For example, as illustrated in FIG. 5, viewing window 515 includes a number of selections available for filtering event data. The first selection include all recordings, and the event table and graphical depiction include all event data for the selected time period. The user may also scroll to select individual cameras as illustrated, as well as particular triggering events for each camera. As illustrated, the individual cameras provide additional filters for both motion-initiating events and sound-initiating events. Additional filters may be included such as manual filters, or rule-based filters, for example, but any number of filter mechanisms may be included for parsing event data, and are to be understood as being encompassed by the present technology, which may be used in combination to further filter data per a user preference.

By scrolling over the filters, the user may provide an instruction to the electronic device to apply the selected or highlighted filter to the event table. Again, for example, a user may utilize a remote control for maneuvering a selection box or highlight over aspects of the overlay that may allow further interaction or selection by the user. In response, the electronic device may apply at least one filter to the event table. The application of the filter may filter not only the event data displayed in the event table, but may also adjust the bar chart height and/or color to include only the items of event data included by the at least one filter. For example, if a user selects to filter the event data to include only data from a particular camera, such as a front-door camera for example, event data from other cameras and/or sensors may be removed from both the event table and the graphical depiction such that the graphical depiction includes only data for the particular camera selected. Accordingly, if the number of events in the discrete time intervals reduces, the color and/or height may change based on the total number of events occurring during that time interval as previously described. This may provide an additional indication to a user of what intervals to review for an individual camera that a user may deem to be important.

As previously described, the electronic device may be a home automation system hub, which may also be included with a television receiver, such as a satellite or cable set-top box. Such a hub may include input components to receive multimedia data including broadcast programming as well as user input, such as from a remote control. The electronic device may then be coupled with a display device, such as a television or screen. The electronic device may also be able to receive video data from communicatively coupled cameras over a network input, such as with cameras that include cloud-based storage of recorded information. Overlay 500 may take a variety of forms, which may be further adjusted by a viewer. For example, the overlay may be a complete or partial overlay, and may be presented as a split-screen, picture-in-picture view, or punch-though as illustrated. Any number of user-adjustable configurations may be used to allow a user to view and review home automation information as well as watch broadcast or downloaded material simultaneously.

Figure 6:
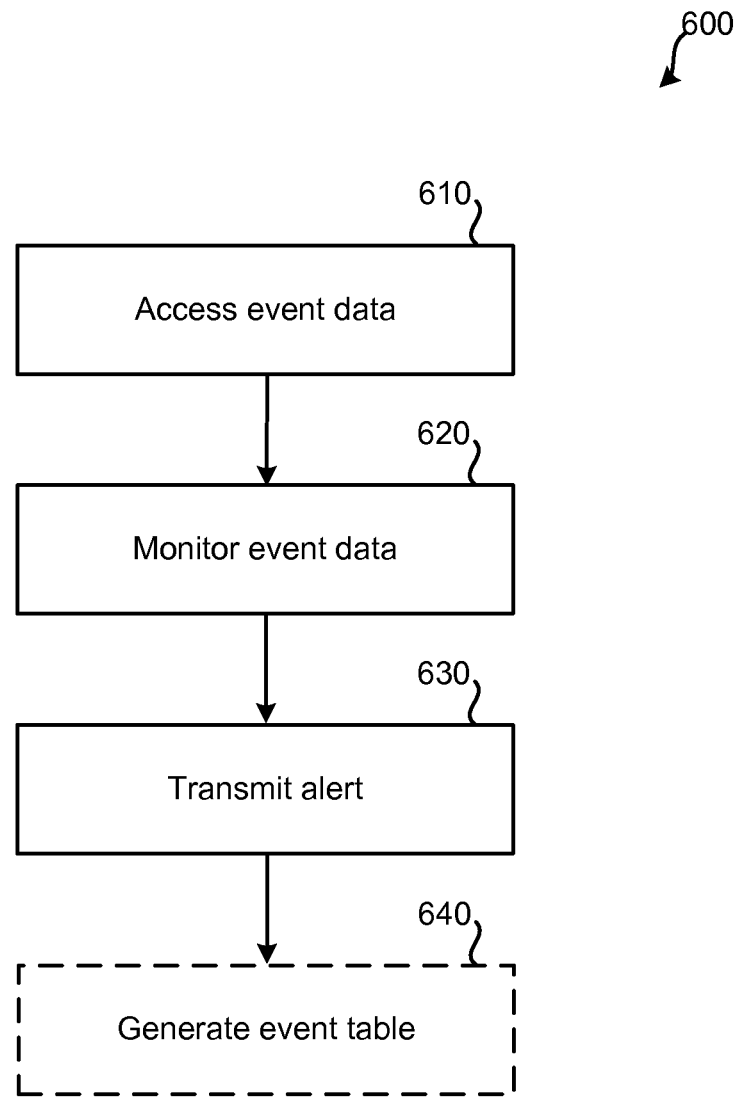
FIG. 6 shows another simplified flow diagram of a method of coordinating home automation activity according to embodiments of the present technology.

Turning to FIG. 6 is illustrated a method 600 of coordinating home automation activity according to the present technology. The method may include accessing event data from a storage database communicatively coupled with an electronic device at operation 610. The database may be local or remote, and each item of event data may include a time and date at which the event data was collected as previously described. The method may also include monitoring the event data to determine that the number of items of event data for a discrete time interval surpasses a pre-defined threshold at operation 620. The method may still further include transmitting an alert to a mobile device indicating that the pre-defined threshold has been surpassed at operation 630.

The event data, which may include video recordings, may be stored locally at the electronic device, or remotely on a network-accessible storage device, including cloud storage maintained by a provider system. The monitoring may be performed by the electronic device itself, such as by a processor of the electronic device, or may be monitored by the database, such as by the database management system, of the storage device. If the event data is monitored by the electronic device, the database may provide updates to the electronic device whenever new event information is received. The electronic device may then update an event table and compare the data values against threshold values for providing alerts. If the database management system or database is performing the monitoring, it may receive threshold values from the electronic device, such as user-defined preferences, and then provide an announcement or alert to the electronic device when the threshold values are surpassed.

The threshold values may take several forms including both a discrete number as well as a pattern. In embodiments, the threshold values may include rules such as if the number of events in a discrete time interval surpasses 5, or any other number, or extends into the orange or red color as previously discussed, an alert is transmitted to the user. Rules may also be used if an amount of movement above a threshold is detected, or a sound above a threshold. Once a system is enabled, a user may adjust these settings based on typical occurrences around the property. Moreover, a rule may be enacted that if a pattern of alerts is received, an alert is transmitted to the user. An exemplary pattern may include a series of alerts from consecutive sensors or motion-activated cameras around a property. If cameras are positioned at each corner of a property, and are triggered in order within a particular time interval, such as a few seconds, or less than a minute, or about a few minutes depending on the property size, etc., an alert may be sent even if the number of discrete events is otherwise below a defined threshold for sending alerts. An order for the sensor triggers may include any pattern or sequence by which a user has set, or the system has been set, to recognize possible negative activity, such as criminal casing. Once a threshold or trigger has been satisfied, the electronic device may transmit an alert to the mobile device.

The method 600 may optionally include generating an event table as previously described at operation 640. The event table may be routinely updated to include each event recorded by the home automation or security system, and may receive updates from an external storage, or may be interconnected with the security features to receive automatic recognition of event data. The event table may be similar to that previously described, and may identify the number of events occurring during discrete time intervals for a date range or period of time. The event table may include a graphical depiction of the number of events that occurred for each discrete time interval. Additionally, the graphical depiction may include a bar chart having a bar for each discrete time interval, and the bar height and/or color may be commensurate with the number of items of event data occurring for each discrete time interval.

Figure 7C:
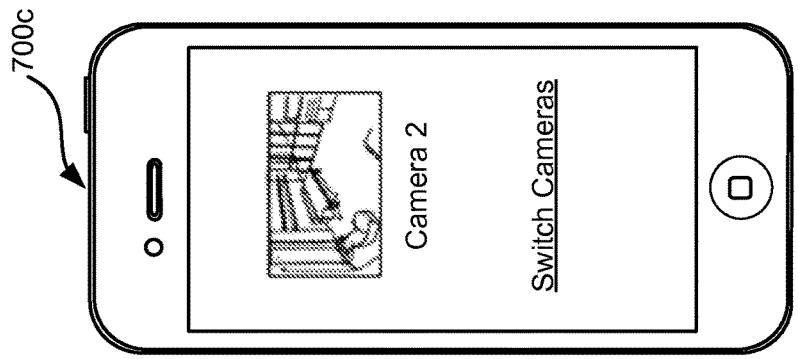
FIGS. 7A-7C illustrate an exemplary alert received by a user according to embodiments of the present technology.
Figure 7B:
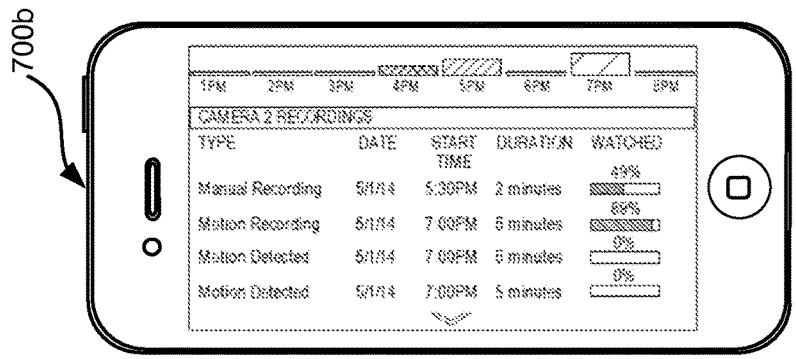
Figure 7A:
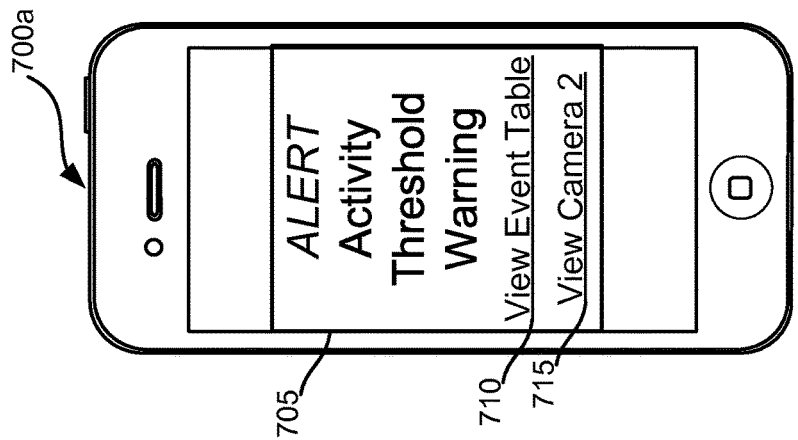

The alert may take any number of forms, an example of which is illustrated in FIGS. 7A-7C. As illustrated in the figure, the electronic device may transmit an alert 705 to a mobile device 700, such as a mobile phone, to a user. The electronic device may utilize various communication paths for communicating with various users' mobile devices. These communication paths may include one or more of: a push notification server system, an SMS server system, an email server system, a telephone service provider network, social media, or a general network. The push notification server system may be a system that causes a mobile device to display a message such that the message must be actively dismissed by the user prior to or otherwise interacting with the mobile device. As such, a push notification has a high likelihood of being viewed by a user since the user is required to dismiss the push notification before performing any other functions, home automation related or not, with the mobile device.

Alert 705 may include a variety of information, such as a notification that activity has surpassed a defined threshold, or that suspicious activity has been identified. Based on the notification or alert, the alert may include one or more links accessible by the user. By utilizing a cloud storage system for video recordings and streaming, a user may access one or more cameras or sensor devices while away from the hub and or property under automation or surveillance. Additionally, if the network hub, such as a set-top box, includes a network connection, a user may access his device across the network in order to access video streams or information from the electronic device. In this way, the alert may include a link to a camera 715 associated with at least one of the items of event data, up to all cameras of the system, as illustrated in FIG. 7C. A user may view live footage of the camera as well as recorded event data in embodiments. The camera provided may be based on that camera being one associated with the event data. Additionally, the provided view may allow a user to access alternate cameras to view surrounding areas of the property.

Figure 9:
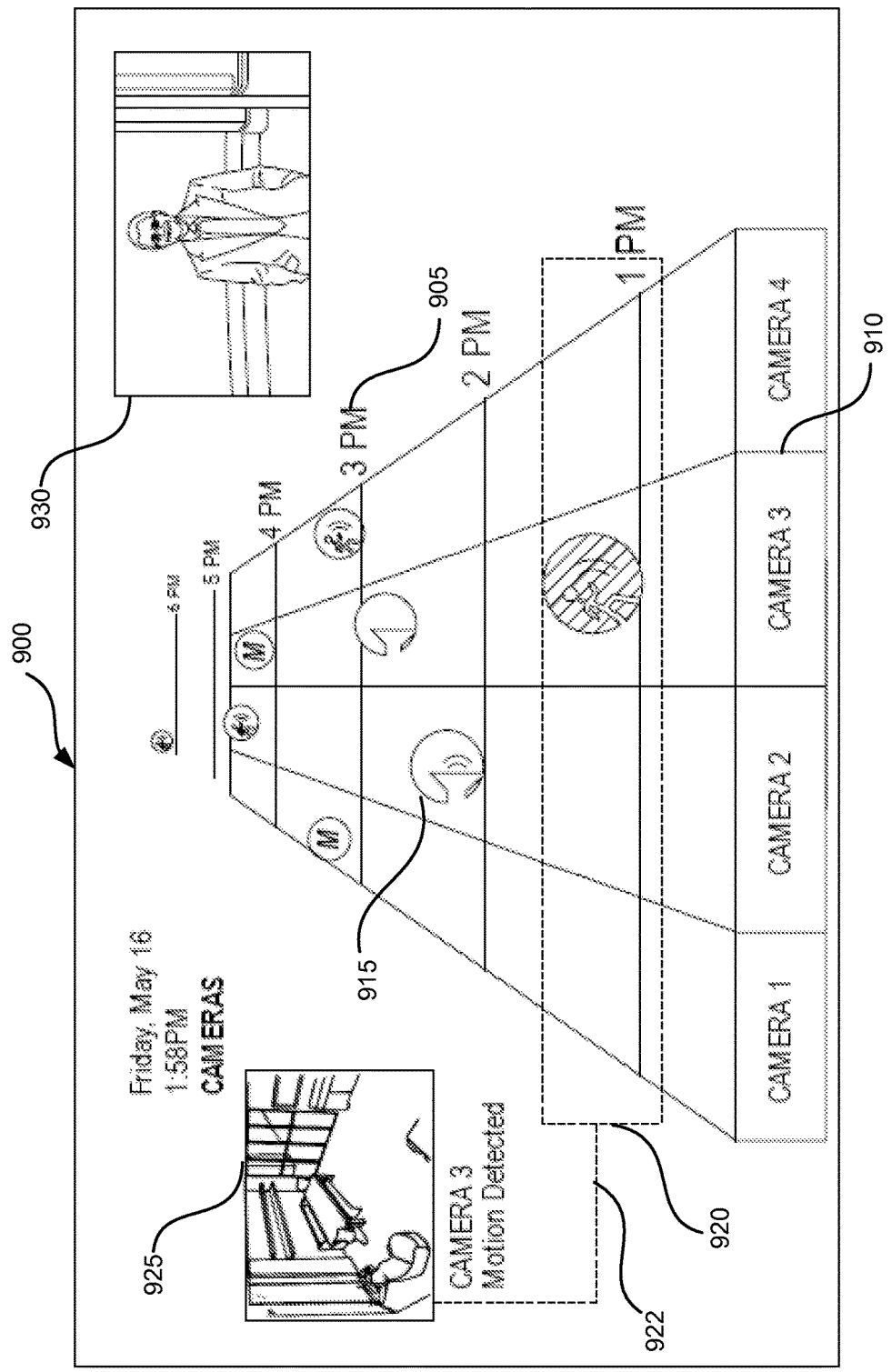
FIG. 9 illustrates another exemplary overlay of an event table identifying events occurring during discrete time intervals according to embodiments of the present technology.
Figure 10:
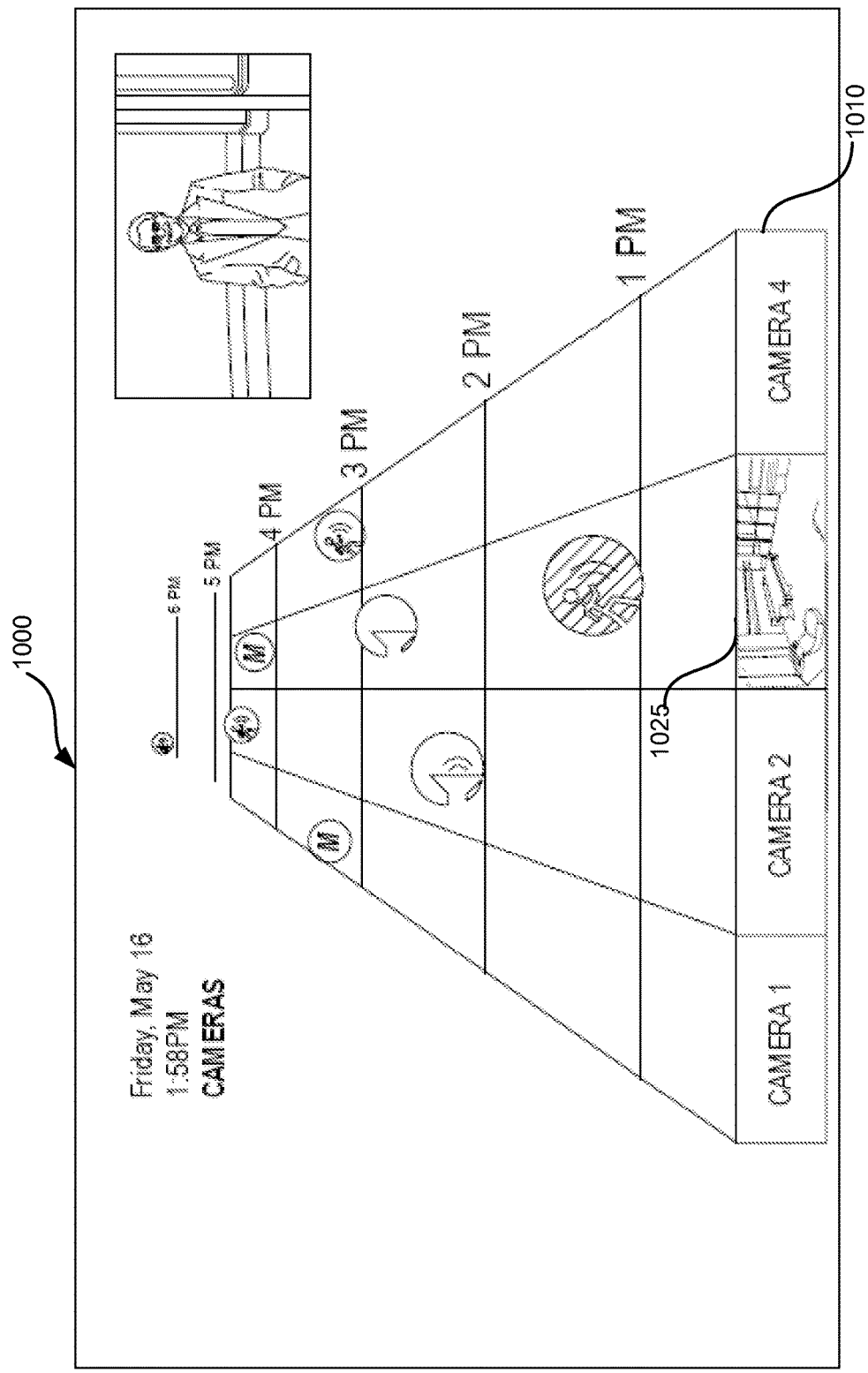
FIG. 10 illustrates another exemplary overlay of an event table identifying events occurring during discrete time intervals according to embodiments of the present technology.

The alert may additionally or alternatively include a link 710 to access the generated event table for review of the overall system by the user as illustrated in FIG. 7B. Once accessed, the user may review the aspects of the event table as previously described. The event table as accessed on the mobile device may also include links selectable by a filter or otherwise accessible on a mobile platform to live-stream a camera of the home automation system. In this way, a user may be able to determine the best view of an event that may be unfolding, and access appropriate cameras or sensors. The available information and tools to the user may also include allowing a user to record from any camera manually by selecting the camera and enabling it. Similarly, the user may interact with other aspects of the home automation system, such as to lock/unlock doors, turn on/off equipment that is connected with the system, or access speakers to talk remotely with burglars, kids, or pets, for example. As will be explained below, the alert may also include a graphical, perspective depiction as illustrated in FIGS. 9 and 10 that may be accessed and manipulated by the user as well.

Figure 8:
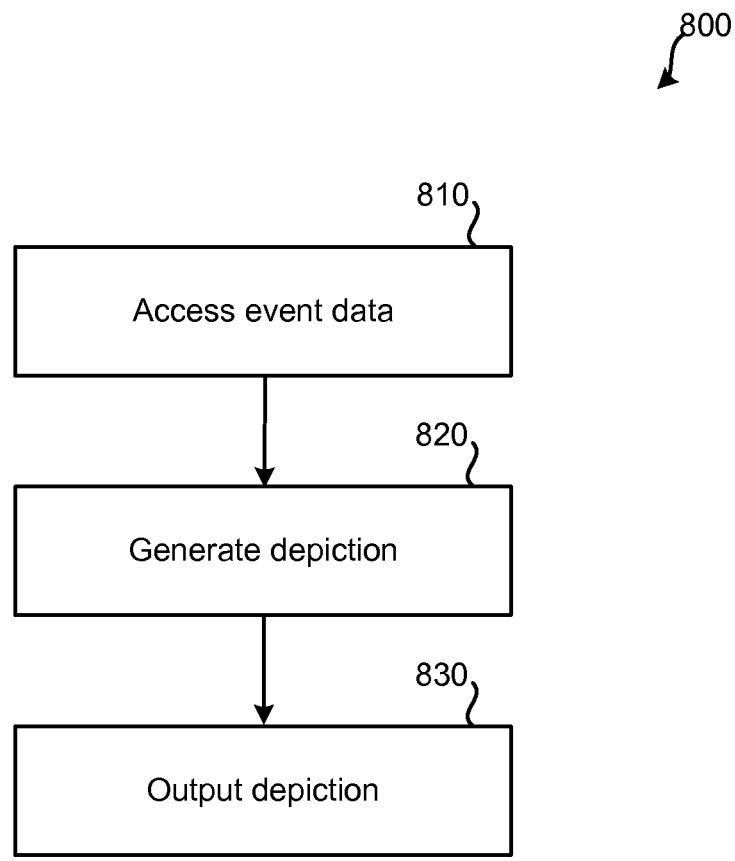
FIG. 8 shows another simplified flow diagram of a method of coordinating home automation activity according to embodiments of the present technology.

Turning to FIG. 8 is shown another method 800 of coordinating home automation activity. Similarly to the above-described methods, the method 800 may include accessing event data from a storage database communicatively coupled with an electronic device at operation 810. Again, the storage database may be local or remote including a network-accessible database, or some combination of both. Additionally, each item of event data may include a time and date at which the event data was collected, along with any additional information as previously discussed including video recordings. The method may also include generating a graphical, perspective depiction at operation 820 that identifies the number of events occurring during discrete time intervals for a date range or period of time. In embodiments, the depiction may include the discrete time intervals in perspective view. The method may further include outputting the graphical, perspective depiction from the electronic device for display on a display device at operation 830.

The electronic device may be or include a television receiver, and may in embodiments be a satellite or cable set-top box, which may act as a hub for the home automation system. The hub may include an input for receiving multimedia data, which may include broadcast programming including cable or satellite broadcast television, on-demand programming, or internet-based data. The hub may also include an input for receiving user input such as with a remote control or mobile device. In embodiments, the hub may include one or more input components configured to receive video data from at least one communicatively coupled camera. The input may be an actual input for a camera of the system, or the camera may provide the video data or recordings to an additional database for storage that is accessible by the hub, such as over a network.

The graphical, perspective depiction may allow one or more cameras of the system to be identified and event data associated with the camera to be displayed in a useful way for the user to quickly and easily identify events occurring over a period of time. An exemplary graphical, perspective depiction is illustrated at FIG. 9. As illustrated, the graphical, perspective depiction 900 includes an interface for displaying home automation equipment, such as sensors, or cameras as illustrated, as well as a timeline of events. Discrete time intervals 905 are displayed in perspective view in the depiction, and individual cameras, or other sensors, of a home automation system may be shown within the graphical, perspective view as well. In embodiments, each item of data may also include a video recording that may be accessed or streamed by a user from the graphical, perspective depiction.

Event icons 915 may be utilized for each item of event data, and may be positioned along the perspective view of the graphical, perspective depiction according to the time at which the item of event data associated with the event icon was collected. In embodiments the event icons may correspond to, and visually represent, a source of the event data. As merely an example, understanding that any different symbol may be used, the icon associated with the event type may include, for example, a speaker depiction for a sound-initiated event or recording, a person depicted in motion for a motion-initiated event or recording, a symbol such as an "M" for a manual recording, etc. Additionally, in embodiments a user may choose icons for each event type, or load images to be used for each event type icon, such as family pictures, words, etc. The source for each item of event data may be a specific triggering event for camera recording, such as motion detection, sound detection, an instruction to manually record, and a rule-initiated recording as previously described. For example, a rule-initiated recording may be triggered by an alarm, or a connected device as described elsewhere.

As illustrated in the exemplary graphical depiction, the individual cameras 910 are shown horizontally against the perspective view of discrete time intervals, and the individual cameras are shown as abscissae to the time intervals in perspective view. Although four cameras are shown in the illustration, it is to be understood that any number of cameras or sensors may be included in the graphical depiction depending on user setup, system components, etc. A user may also customize these features in embodiments to include pages of cameras, for example, in order to show a less crowded view when many cameras or sensors are included in the depiction. With such a depiction, more detail may be shown than in the bar chart previously described. For example, by looking along the perspective view, and considering the individual icons, a user may quickly identify not only the number of events that have occurred, but also the type and location, such as by knowing the location of each camera, in order to quickly glean the events of a time period or day.

Graphical, perspective depiction 900 may be configured as an overlay, picture-in-picture, split-screen of some sort, or punch-through as illustrated to include programming 930 while a user is reviewing event activity from the time period. Additionally, in embodiments the graphical depiction may include a detection field 920 associated with the discrete time interval associated with the nearest time displayed in the perspective view. The exemplary detection field is illustrated as a box around the discrete time interval across each camera. Event icons that are contained within the detection field may be differentiated from other event icons of the graphical depiction, so as to further enable a user to determine what is being reviewed. For example, the event icon within the detection field may be colored, shaded, etc. in order to provide an additional visual differentiation for the user. As illustrated in the Figure, a user may be currently reviewing activity at 1 PM, for example, where a motion-initiated recording was received at camera 3.

The detection field 920 may also display a graphical connection between event icons positioned within the detection field 920 and a view from the video recording associated with the individual camera corresponding to the item of event data. For example, the graphical connection may include a graphical boundary surrounding the graphical, perspective depiction and a connector 922 between the graphical boundary and a view from the video recording 925 associated with the individual camera corresponding to the item of event data. When multiple event icons are located within the detection field 920, multiple camera views 925 may be tiled along the side of the graphical depiction so a user can view each event. The camera view 925 may include any number of views for a corresponding event icon. For example, when an event icon is displayed within the detection field, an image of the recording may be displayed, or in embodiments, the video may automatically begin streaming.

The electronic device or hub may also be configured to receive instructions from a remote control having ordinate and abscissa directionality controls, including horizontal and vertical buttons or inputs, such as a television receiver remote control. The remote control may have at least four keys for providing input, and at least two keys provide ordinate or vertical-based instructions, and at least two keys provide abscissa or horizontal-based instructions. By receiving an ordinate or vertical directionality control instruction, the graphical depiction may adjust along the perspective view of the discrete time intervals. For example, by selecting up, the view may scroll to the next discrete time interval, while the current time interval is removed from the depiction. Similarly, by selecting down, a new time interval may be added to the bottom of the depiction while the other discrete time intervals are shifted further along the perspective. Additionally, the vertical inputs may simply move the detection field along the perspective discrete time intervals, and in embodiments additional vertical inputs, such as page up or down commands actually change the time intervals displayed along the perspective view. Horizontal or abscissa-based instructions may adjust the view from one individual camera to the next, or may shift the number of cameras displayed, such as from cameras 1-4, to cameras 5-8, for example. Additionally, horizontal instructions may adjust the focus or view of a camera or may rotate or move the camera itself.

In the alert system previously described, the graphical, perspective depiction may be linked with an alert similarly to the event table earlier described. Such a perspective depiction may also be easily manipulated and controlled on a mobile device, which may allow touch control and operation. For example, a mobile device including a mobile phone may have a touch screen or allow touch-sensitivity-based controls, and thus a swipe vertically across the touch screen may provide adjustments along the perspective view as previously described, and a horizontal swipe may provide adjustments along the camera views, or may adjust the position or focus of an individual camera. A user may also be able to select individual cameras such as by selecting the horizontally listed camera itself to view events during the time period for that camera.

An additional embodiment of a graphical depiction 1000 is illustrated in FIG. 10, where the view from the video recording 1025 associated with the individual camera corresponding to the item of event data is positioned within that camera space. For example, where individual cameras 1010 are listed horizontally, a view of the video recording, such as an image or a streaming view of the video recording may be presented when an event icon is located at the currently viewed discrete time interval along the perspective view. As illustrated, a motion-detection is displayed at the currently viewed time of 1 PM for camera 3, accordingly, an image from the video recording, or the video recording itself may be displayed in the space corresponding to the horizontal listing of the individual camera 3, which is the camera associated with the item of event data. This may provide an additional means for reviewing multiple event icons for a discrete time interval without question of which video is from which camera, for example.

Figure 11:
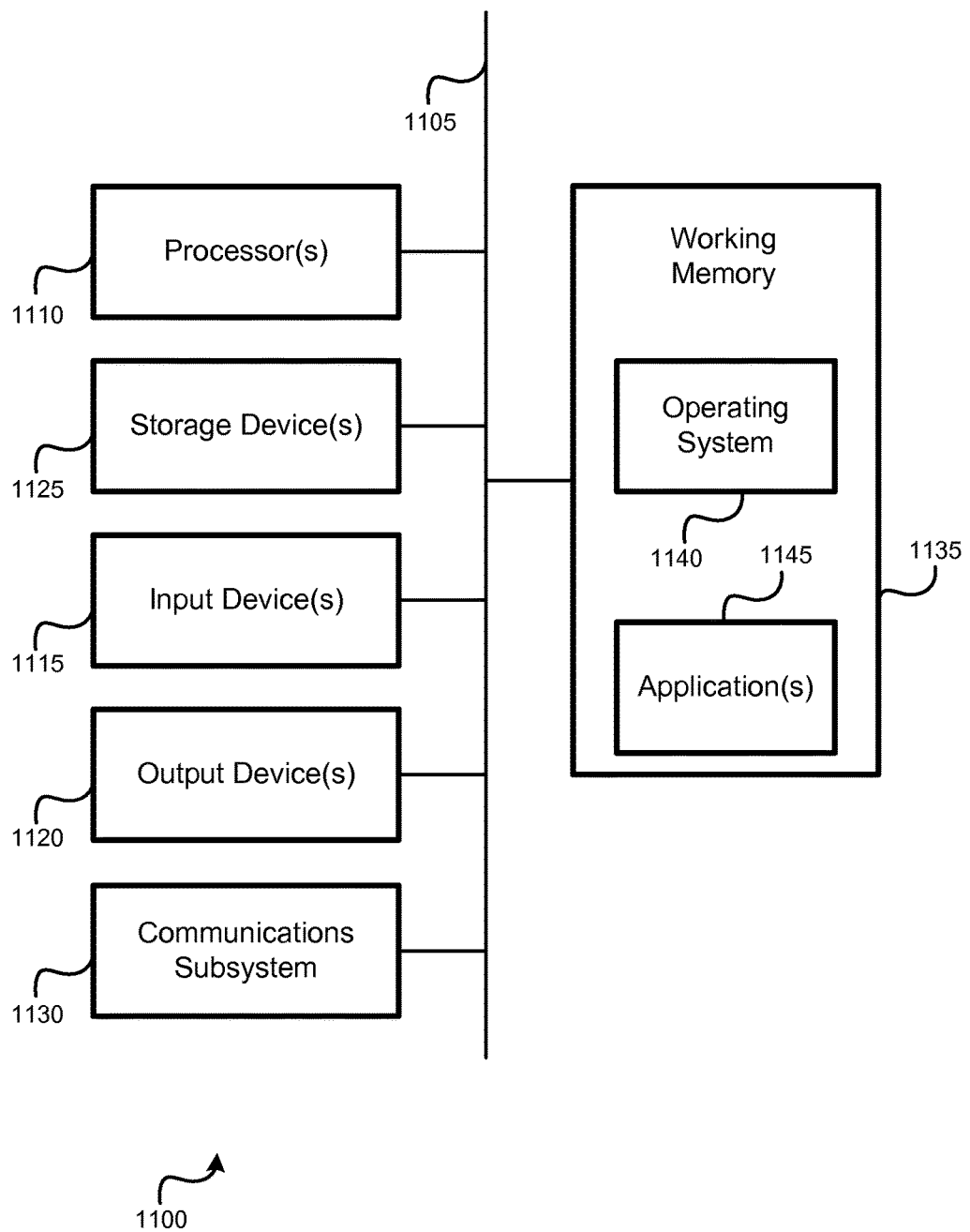
FIG. 11 shows a simplified computer system that may be utilized to perform one or more of the operations discussed.

FIG. 11 illustrates an embodiment of a computer system 1100. A computer system 1100 as illustrated in FIG. 11 may be incorporated into devices such as an STB, a first electronic device, DVR, television, media system, personal computer, and the like. Moreover, some or all of the components of the computer system 1100 may also be incorporated into a portable electronic device, mobile phone, or other device as described herein. FIG. 11 provides a schematic illustration of one embodiment of a computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105, or may otherwise be in communication, as appropriate. The hardware elements may include one or more processors 1110, including without limitation one or more general-purpose processors and/or one or more special-purpose processors such as digital signal processing chips, graphics acceleration processors, and/or the like; one or more input devices 1115, which can include without limitation a mouse, a keyboard, a camera, and/or the like; and one or more output devices 1120, which can include without limitation a display device, a printer, and/or the like.

The computer system 1100 may further include and/or be in communication with one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1130 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1130. In other embodiments, a portable electronic device, e.g. the first electronic device, may be incorporated into the computer system 1100, e.g., an electronic device or STB, as an input device 1115. In many embodiments, the computer system 1100 will further comprise a working memory 1135, which can include a RAM or ROM device, as described above.

The computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 4, 6 or 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1100 to perform methods in accordance with various embodiments of the technology. According to a set of embodiments, some or all of the procedures of such methods are performed by the computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of coordinating home automation activity, the method comprising:
   accessing event data from a storage database communicatively coupled with an electronic device, wherein each item of event data comprises a time and date at which the event data was collected;
   generating an event table identifying a number of events occurring during discrete time intervals for a date range, wherein the event table includes a graphical depiction of the number of events that occurred for each discrete time interval, wherein the graphical depiction comprises a bar chart having a bar for each discrete time interval, and wherein the event table includes selectable filters;
   receiving an instruction to apply a filter to the event table;
   applying at least one filter to the event table, wherein application of the filter adjusts bar height of the bar chart to include only the items of event data included by the at least one filter; and
   outputting the event table from the electronic device for display on a display device.

2. The method of claim 1, the method further comprising:
   receiving an instruction selecting one or more of the discrete time intervals; and
   in response to the instruction, further outputting for display a tabularized description of each item of event data occurring during the selected one or more discrete time intervals.

3. The method of claim 2, wherein each item of event data further includes a video recording.

4. The method of claim 3, further comprising, in response to the instruction, further outputting for display at least an image associated with each video recording for each item of event data occurring during the selected one or more discrete time intervals.

5. The method of claim 3, wherein the tabularized description for each item of event data includes at least one item selected from the group consisting of a start time for the video recording, an amount of the video recording viewed, an identification of a camera capturing the video recording, and an event type.

6. The method of claim 5, wherein the event type comprises a manual recording, a motion-initiated recording, a sound-initiated recording, or a rule-initiated recording.

7. The method of claim 6, wherein a rule-initiated recording is triggered by an alarm, or a connected device.

8. The method of claim 1, wherein the storage database comprises at least one of a local database, or a network-accessible storage database.

9. The method of claim 1, wherein the bar height and/or a bar color is commensurate with a number of items of event data occurring for each discrete time interval.

10. The method of claim 1, wherein the selectable filters include at least one option to filter by discrete time interval, camera, or trigger.

11. The method of claim 1, wherein the electronic device comprises a television receiver.

12. A home automation system hub comprising:
   a first input component configured to receive multimedia data;
   a second input component configured to receive user input;
   at least one output component communicatively coupled with at least one display device;
   one or more processors; and
   memory communicatively coupled with and readable by the one or more processors and having stored therein processor-readable instructions, which when executed by the one or more processors cause the one or more processors to:

access event data from a storage database communicatively coupled with an electronic device, wherein each item of event data comprises a time and date at which the event data was collected;

generate an event table identifying a number of events occurring during discrete time intervals for a date range, wherein the event table includes a graphical depiction of the number of events that occurred for each discrete time interval, wherein the graphical depiction comprises a bar chart having a bar for each discrete time interval, and wherein the event table includes selectable filters;

receiving an instruction to apply a filter to the event table;

applying at least one filter to the event table, wherein application of the filter adjusts bar height of the bar chart to include only the items of event data included by the at least one filter; and output the event table from the electronic device for display on a display device.

13. The home automation system hub of claim 12, wherein the multimedia data comprises satellite broadcast television, and wherein the home automation system hub further comprises a network input component configured to receive video data from communicatively coupled cameras.

14. The home automation system hub of claim 12, wherein the bar height and/or a bar color is commensurate with a number of items of event data occurring for each discrete time interval.

* * * * *